(12) United States Patent
Yoshida et al.

(10) Patent No.: US 8,089,979 B2
(45) Date of Patent: Jan. 3, 2012

(54) PACKET RELAY APPARATUS AND PACKET RELAY METHOD

(75) Inventors: Mitsukuni Yoshida, Fukuoka (JP); Yushi Murata, Fukuoka (JP); Takeshi Miyaura, Fukuoka (JP); Eiji Sakakibara, Yokohama (JP); Shigeru Kotabe, Kawasaki (JP); Marika Koga, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 11/839,849

(22) Filed: Aug. 16, 2007

(65) Prior Publication Data

US 2008/0002728 A1 Jan. 3, 2008

Related U.S. Application Data

(63) Continuation of application No. PCT/JP2005/002463, filed on Feb. 17, 2005.

(51) Int. Cl.
*H04L 12/28* (2006.01)

(52) U.S. Cl. ........ 370/419; 370/231; 370/238; 370/252; 370/351; 370/352; 370/353; 370/354; 370/355; 370/356; 370/375

(58) Field of Classification Search .................. 370/231, 370/238, 252, 351, 389, 419
See application file for complete search history.

(56) References Cited

U.S. PATENT DOCUMENTS

| 2002/0009054 A1* | 1/2002 | Suzuki et al. ................. 370/252 |
| 2003/0103763 A1* | 6/2003 | Sugimura et al. ............... 386/65 |
| 2003/0164897 A1* | 9/2003 | Chen et al. .................... 348/459 |
| 2003/0219014 A1* | 11/2003 | Kotabe et al. ................. 370/375 |
| 2004/0100989 A1* | 5/2004 | Chiu et al. .................... 370/463 |
| 2005/0259629 A1* | 11/2005 | Oliver et al. .................. 370/345 |
| 2006/0192850 A1* | 8/2006 | Verhaegh et al. .......... 348/14.12 |

FOREIGN PATENT DOCUMENTS

| JP | 10-013434 A | 1/1998 |
| JP | 2000-196662 A | 7/2000 |
| JP | 2000-232474 A | 8/2000 |
| WO | WO 2006/087788 A1 | 8/2006 |

\* cited by examiner

*Primary Examiner* — Hassan Phillips
*Assistant Examiner* — Gautam Sharma
(74) *Attorney, Agent, or Firm* — Katten Muchin Rosenman LLP

(57) ABSTRACT

A packet relay apparatus for suppressing a burst transfer of packets being relayed to improve the quality and reliability of packet communication. In the packet relay apparatus, an arrival time measurement block measures the arrival time of an input packet to generate arrival time information; a packet classification block classifies the packet as an output-interval-control packet, which requires output interval control, or a non-output-interval-control packet, which does not require output interval control, to generate classification information; a packet distribution block receives the packet which has been processed and switched and places the packet in an appropriate queue according to the classification information; and a schedule management block performs relay output control in accordance with the arrival time information such that the output intervals of output-interval-control packets become equal to the input intervals obtained when the packets were input to the apparatus.

3 Claims, 14 Drawing Sheets

| LABEL | ARRIVAL TIME (Tar) | RELATIVE INPUT TIME (Tr) | VALID READOUT TIME (Tav) | PACKET OUTPUT TIME (To) | COUNTER SETTING TIME (Tc) |
|---|---|---|---|---|---|
| | | | | | |

24a QUEUE TABLE

FIG. 5

| LABEL | ARRIVAL TIME (Tar) | RELATIVE INPUT TIME (Tr) | VALID READOUT TIME (Tav) | PACKET OUTPUT TIME (To) | COUNTER SETTING TIME (Tc) |
|---|---|---|---|---|---|
| LABEL A1 | Tar A1 | 0 | Tav A1 | | 0 |

24a-1 QUEUE TABLE

FIG. 7

| LABEL | ARRIVAL TIME (Tar) | RELATIVE INPUT TIME (Tr) | VALID READOUT TIME (Tav) | PACKET OUTPUT TIME (To) | COUNTER SETTING TIME (Tc) |
|---|---|---|---|---|---|
| LABEL A1 | Tar A1 | 0 | Tav A1 | | 0 |
| LABEL A2 | Tar A2 | Tr A1 | | | |

24a-2 QUEUE TABLE

FIG. 8

| LABEL | ARRIVAL TIME (Tar) | RELATIVE INPUT TIME (Tr) | VALID READOUT TIME (Tav) | PACKET OUTPUT TIME (To) | COUNTER SETTING TIME (Tc) |
|---|---|---|---|---|---|
| LABEL A1 | Tar A1 | 0 | Tav A1 | To A1 | 0 |
| LABEL A2 | Tar A2 | Tr A1 | | | Tr A1 |

24a-3 QUEUE TABLE

FIG. 9

| LABEL | ARRIVAL TIME (Tar) | RELATIVE INPUT TIME (Tr) | VALID READOUT TIME (Tav) | PACKET OUTPUT TIME (To) | COUNTER SETTING TIME (Tc) |
|---|---|---|---|---|---|
| LABEL A2 | Tar A2 | Tr A1 | Tav A2 | | Tr A1 |
| LABEL A3 | Tar A3 | Tr A2 | | | |

24a-4 QUEUE TABLE

24a-5 QUEUE TABLE

| LABEL | ARRIVAL TIME (Tar) | RELATIVE INPUT TIME (Tr) | VALID READOUT TIME (Tav) | PACKET OUTPUT TIME (To) | COUNTER SETTING TIME (Tc) |
|---|---|---|---|---|---|
| LABEL A2 | Tar A2 | Tr A1 | Tav A2 | To A2 | Tr A1 |
| LABEL A3 | Tar A3 | Tr A2 | Tav A3 | To A3 | Tr A2 − ΔTc |

ΔTc = To A2 − Tav A2

PACKET RELAY APPARATUS AND PACKET RELAY METHOD

This application is a continuing application, filed under 35 U.S.C. Section 111(a), of International Application PCT/JP2005/002463, filed on Feb. 17, 2005.

BACKGROUND OF THE INVENTION

1. Field of the Invention

The present invention relates to packet relay apparatuses and packet relay methods, and particularly to a packet relay apparatus for performing packet relay control and a packet relay method for performing packet relay control.

2. Description of the Related Art

Many applications such as real-time voice processing for telephone communication, video, and the like, remote control by a robot, and remote medical practice (surgery) have been developed in recent years. When information used in these applications is packetized for packet communication, missing data or a delay of just one single packet would have a great influence on the speech quality or the reproduction quality. Accordingly, highly-reliable communication with a good quality of service (QoS) has been required, and traffic control that can protect application operations from failure has been desired.

Conventional traffic control can be broadly divided into priority control and bandwidth control. In priority control, the priorities of packet types are determined, and the packets are sent in order of priority.

In bandwidth control, a bandwidth that can be used by particular packets (packets having high real-time characteristics) is determined among the entire bandwidth of a transmission path, and the other packets are sent in the remaining bandwidth under priority control. For example, if the entire bandwidth is 100 Mbps, a bandwidth of 30 Mbps is always reserved for video packets, and the remaining bandwidth of 70 Mbps is used to send non-video packets in order of priority.

One conventional traffic control technology in packet communication provides a plurality of relay channels in correspondence with packet attributes and sends each packet from the relay channel provided to the corresponding packet attribute (refer to Japanese Unexamined Patent Application Publication No. Hei-10-13434 (paragraph numbers 0017 to 0028, FIG. 1), for instance).

If network congestion occurs, or if packet processing in an apparatus takes much time, the conventional traffic control as described above causes packets to be left unsent in an internal buffer (queue) of the apparatus and to be sent from the buffer in a best-effort manner (sent at the maximum available rate) when the bandwidth becomes available. When this burst transfer occurs, a receiving apparatus could fail to receive a packet.

Networks such as the Ethernet (registered trademark) perform transmission control by using the closed clock of the apparatus (asynchronous clock for transmission and reception), so that there occurs a difference in transmission clock between the transmitting apparatus and the receiving apparatus. A comparison between the clock of the transmitting apparatus and the clock of the receiving apparatus may sometimes reveal a frequency difference of about ±100 ppm.

If an increasing number of packets left unsent in the buffer are sent at once on the transmission path in a best effort manner, increasing the packet traffic to nearly the maximum capacity, the receiving side could not receive all of those packets and could miss some packets because of the difference between the transmission and reception clock timings.

In addition, the conventional receiving apparatus requires a large buffer to stand the burst transfer, regardless of whether a packet is lost or not, so that a large-size apparatus is needed.

If a burst transfer occurs, the packets arrive at the receiving side at irregular intervals, so that the time of reproduction processing on the receiving side would depend on each packet, causing the reproduced video to be disturbed or the sound to be interrupted, which makes the user feel unusual.

SUMMARY OF THE INVENTION

In view of the foregoing, it is an object of the present invention to provide a packet relay apparatus that suppresses a burst transfer in packet relaying to improve the quality and reliability of packet communication.

It is another object of the present invention to provide a packet relay method that suppresses a burst transfer in packet relaying to improve the quality and reliability of packet communication.

To accomplish one of the above objects, there is provided a packet relay apparatus for performing packet relay control. This packet relay apparatus includes the following elements: an input network interface block including an arrival time measurement block for measuring the arrival time of an input packet to generate arrival time information, a packet classification block for classifying the input packet as an output-interval-control packet, which requires output interval control, or as a non-output-interval-control packet, which does not require output control, to generate classification information, and a packet information assignment block for adding packet information that includes the arrival time information and the classification information to the packet; an output network interface block including a packet distribution block for receiving the packet which has been processed by the input network interface block and has been switched and for placing the output-interval-control packet or the non-output-interval-control packet in an appropriate queue in accordance with the classification information, a schedule management block for performing relay output control in accordance with the arrival time information such that the output intervals of output-interval-control packets are adjusted to the input intervals obtained when the packets were input to the apparatus, and a packet readout block for reading the output-interval-control packet or the non-output-interval-control packet from the queue in accordance with a readout instruction from the schedule management block and outputting the packet; and a switch block for switching the packet output from the input network interface block to the output network interface block.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows a queue table.

FIG. 7 shows a state of the queue table.
FIG. 8 shows a state of the queue table.
FIG. 9 shows a state of the queue table.
FIG. 10 shows a state of the queue table.
FIG. 11 shows a state of the queue table.

DESCRIPTION OF THE PREFERRED EMBODIMENTS

Figure 1:
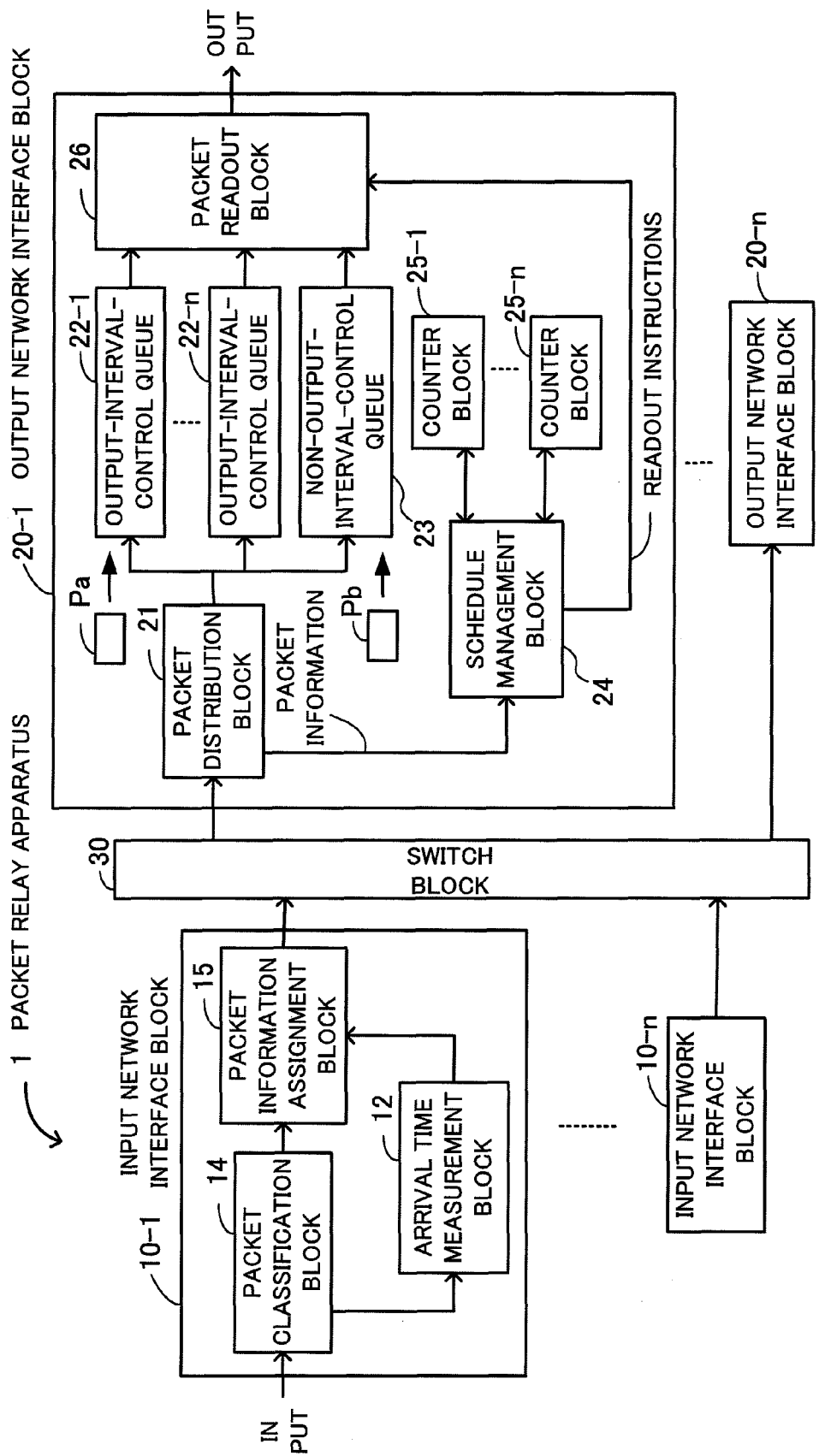
FIG. 1 is a view showing a principle of a packet relay apparatus according to an embodiment of the present invention.

An embodiment of the present invention will be described below with reference to the drawings. FIG. 1 is a principle diagram of a packet relay apparatus 1 according to an embodiment of the present invention. The packet relay apparatus 1 includes input network interface blocks 10-1 to 10-$n$, output network interface blocks 20-1 to 20-$n$, and a switch block 30, and the apparatus performs packet relay control.

Each of the input network interface blocks 10-1 to 10-$n$ includes an arrival time measurement block 12, a packet classification block 14, and a packet information assignment block 15. The arrival time measurement block 12 measures the arrival time of an input packet and generates arrival time information.

When the packet is relayed and output from the apparatus, the packet classification block 14 classifies the packet as an output-interval-control packet Pa, which requires output interval control, or as a non-output-interval-control packet Pb, which does not require output interval control, in accordance with its flow type, and generates classification information.

The output-interval-control packet Pa is a packet which requires real-time characteristics for applications such as video, VoIP, and other voice communication, and the non-output-interval-control packet Pb is a packet which does not require real-time characteristics for applications such as file transfer. The non-output-interval-control packet Pb is comparatively irrelevant to data delay or fluctuations and does not require consideration of output control. The packet information assignment block 15 adds packet information that includes the arrival time information and the classification information to the packet.

The switch block 30 switches the packet output from any of the input network interface blocks 10-1 to 10-$n$ to an appropriate one of the output network interface blocks 20-1 to 20-$n$.

Each of the output network interface blocks 20-1 to 20-$n$ includes a packet distribution block 21, output-interval-control queues 22-1 to 22-$n$, a non-output-interval-control queue 23, a schedule management block 24, counter blocks 25-1 to 25-$n$, and a packet readout block 26.

The packet distribution block 21 receives the packet that has been processed by any of the input network interface blocks 10-1 to 10-$n$ and has been switched and places the output-interval-control packet Pa or the non-output-interval-control packet Pb to an appropriate queue in accordance with the classification information.

The output-interval-control queues 22-1 to 22-$n$ store the output-interval-control packets Pa. The non-output-interval-control queue 23 stores the non-output-interval-control packets Pb.

The schedule management block 24 performs such relay output control in accordance with the arrival time information that the output intervals of the output-interval-control packets Pa are adjusted nearly to the input intervals obtained when the packets were input to the apparatus.

To be more specific, the time difference between the arrival time of the packet and the arrival time of the packet arrived immediately therebefore is calculated; a correction time is obtained by correcting the time difference with a delay time required for packet processing in the apparatus; and the correction time is specified as a counter value. As for the non-output-interval-control packets Pb, when all the output-interval-control packets Pa are read out, a readout instruction for the non-output-interval-control packets Pb is generated.

The counter blocks 25-1 to 25-$n$ are provided in correspondence with the output-interval-control queues 22-1 to 22-$n$, and perform counting. The packet readout block 26 reads out the output-interval-control packet Pa from any of the output-interval-control queues 22-1 to 22-$n$ in accordance with the readout instruction given from the schedule management block 24 after the counting is completed, and outputs the packet. The packet readout block 26 also reads out the non-output-interval-control packets Pb from the non-output-interval-control queue 23 in accordance with the readout instruction for the non-output-interval-control packets Pb and outputs to relay the non-output-interval-control packets Pb.

In the packet relay apparatus 1, the input intervals of the output-interval-control packets Pa are measured, and the packet output is controlled to adjust the output intervals to the input intervals. In a network formed with the packet relay apparatus having the structure described above, the packet output intervals can be adjusted to the input intervals, so that a burst transfer between relay apparatuses can be suppressed. Data requiring real-time characteristics for applications such as a moving picture transfer or voice communication can be smoothly reproduced even if the data passes a plurality of such relay apparatuses.

Figure 2:
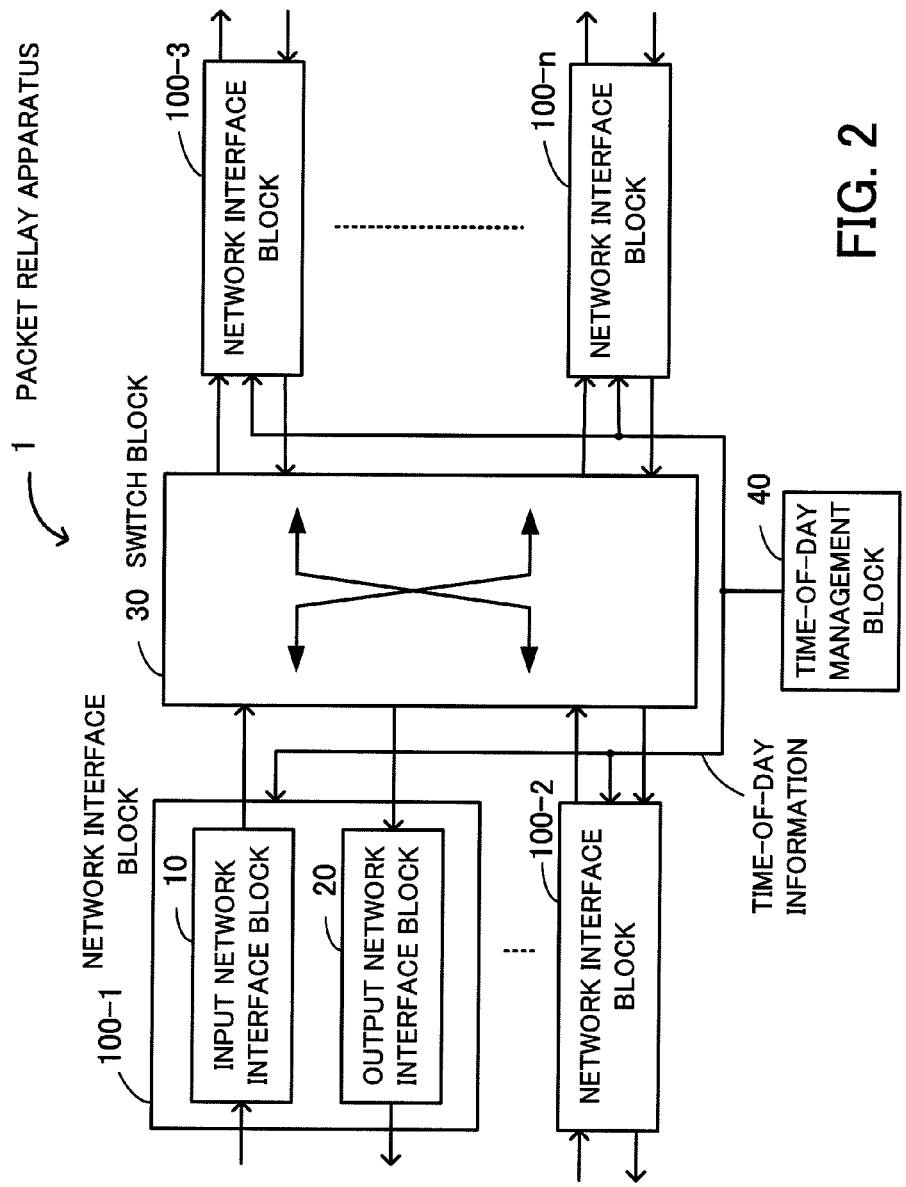
FIG. 2 is a view showing the overall structure of the packet relay apparatus.

FIG. 2 is a view showing the overall structure of the packet relay apparatus 1. The packet relay apparatus 1 includes network interface blocks 100-1 to 100-$n$, the switch block 30, and a time-of-day management block 40. Each of the network interface blocks 100-1 to 100-$n$ includes the input network interface block 10 and the output network interface block 20 described above with reference to FIG. 1.

A packet sent from a channel is subjected to input processing by the input network interface block 10 and switched by the switch block 30 to be sent to the output network interface block 20 connected to a channel toward the destination. The packet is then subjected to output processing performed by the output network interface block 20 and sent through the channel.

The time-of-day management block 40 manages the time of day in the apparatus, and sends time-of-day information (synchronization signal) generated in the apparatus to each of the network interface blocks 100-1 to 100-$n$ (such as the arrival time measurement block 12 and the schedule management block 24 therein) without delay so that the network interface blocks 100-1 to 100-$n$ are synchronized.

Figure 3:
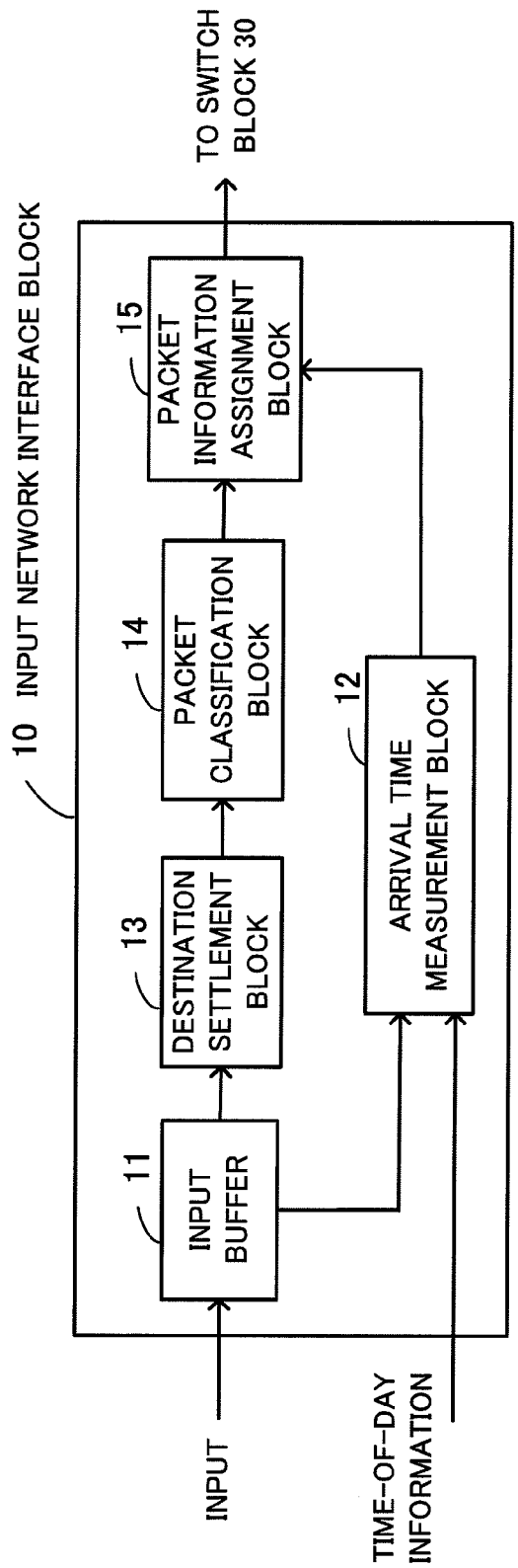
FIG. 3 is a view showing the structure of an input network interface block.

The structures and operation of the input network interface block 10 and the output network interface block 20 will next be described. FIG. 3 is a view showing the structure of the input network interface block 10. The input network interface block 10 includes an input buffer 11, the arrival time measurement block 12, a destination settlement block 13, the packet classification block 14, and the packet information assignment block 15.

The input buffer 11 stores a relayed packet temporarily and informs the arrival time measurement block 12 of the arrival of the packet. The arrival time measurement block 12 recognizes the arrival time of the packet on the basis of the packet arrival notification and the time-of-day information sent from the time-of-day management block 40 and generates the arrival time information, to be added to the header of the packet.

The destination settlement block 13 settles the destination of the packet and sends the packet to the packet classification block 14. The packet classification block 14 judges the flow type of the packet, classifies the input packet as the output-interval-control packet Pa or the non-output-interval-control packet Pb, and generates the classification information. The packet information assignment block 15 adds the packet information, which includes the arrival time information, the classification information, input port information, and the like, to the packet header, and sends the packet to the switch block 30.

The arrival time information will be described here. The time-of-day management block 40 shown in FIG. 2 sends the time-of-day information to the network interface blocks 100-1 and 100-n. The arrival time measurement block 12 in the input network interface block 10 receives the packet arrival notification from the input buffer 11 and converts the time-of-day information to a time stamp (arrival time information). The sampling rate and bit width of the time stamp depend on the apparatus, and a time greater than the maximum delay time of the apparatus can be specified.

If the apparatus has a channel rate of 100 Mbps, it takes 0.08 µs to transfer one byte, so that the sampling rate is set to 0.08 µs. If the maximum delay time of the apparatus is one second, a setting greater than or equal to the maximum delay time of the apparatus is allowed by specifying the bit width of the time stamp to 32 bits (0x0000 0000 to 0xFFFF FFFF).

If a packet p1 has a time stamp of 0x1011 (which indicates "B" in hexadecimal), for instance, and if a packet p2 arrived immediately thereafter has a time stamp of 0x0010 (which indicates "2" in hexadecimal), for instance (16 bits are used in the interest of simplicity), the time stamp of the packet p2 has a lower number than the time stamp of the packet p1, arrived immediately therebefore. On the assumption that this has occurred because of a rollover (ending one round of count operation and starting another round of count operation) of the time stamp, the processing is performed. To be more specific, it is recognized that the packet p2 has arrived at a time stamp of (2) after one round of count operation from the time stamp (B) of the packet p1 arrived before, which is (B)→(C)→(D)→(E)→(F)→(0)→(1)→(2).

Figure 4:
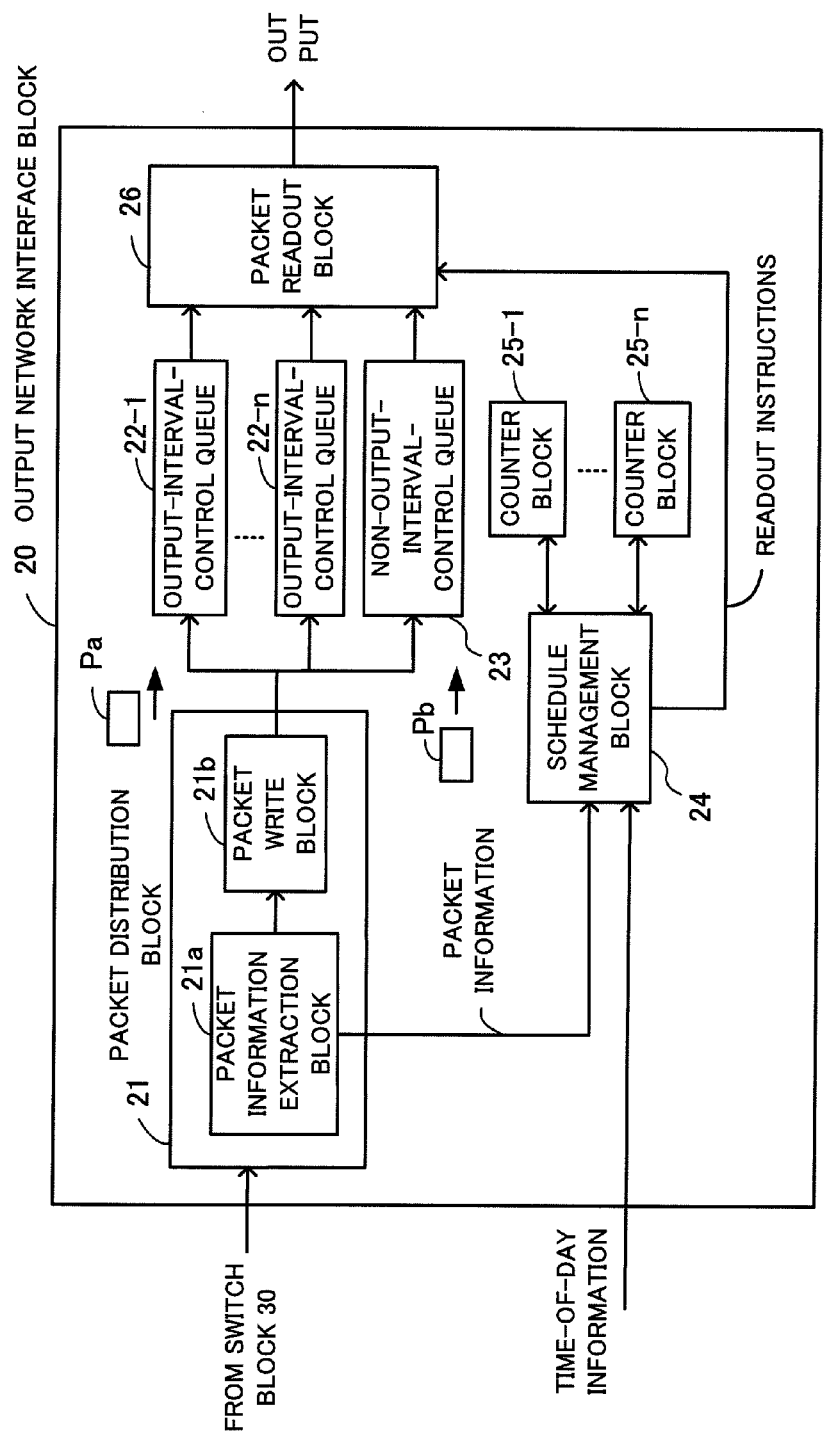
FIG. 4 is a view showing the structure of an output network interface block.

FIG. 4 is a view showing the structure of the output network interface block 20. The output network interface block 20 includes the packet distribution block 21, the output-interval-control queues 22-1 to 22-n, the non-output-interval-control queue 23, the schedule management block 24, the counter blocks 25-1 to 25-n, and the packet readout block 26. The packet distribution block 21 includes a packet information extraction block 21a and a packet write block 21b.

The packet information extraction block 21a extracts the packet information given by the input network interface block 10 and sends the information to the schedule management block 24. The packet write block 21b writes the output-interval-control packet Pa in any of the output-interval-control queues 22-1 to 22-n and the non-output-interval-control packet Pb in the non-output-interval-control queue 23. The packet write block 21b deletes the packet header, which includes the packet information, and writes just the payload in the queue.

The schedule management block 24 judges from which queue the packet can be read, among the output-interval-control queues 22-1 to 22-n and the non-output-interval-control queue 23, and schedules the packet output.

When the output-interval-control packets Pa are read from any of the output-interval-control queues 22-1 to 22-n, the packet output is controlled such that the output intervals become almost equal to the input intervals obtained when the output-interval-control packets Pa were input to the apparatus. When all the output-interval-control packets Pa are read from the output-interval-control queues 22-1 to 22-n, a readout instruction for the non-output-interval-control packets Pb stored in the non-output-interval-control queue 23 is generated.

The counter blocks 25-1 to 25-n are provided in correspondence with the output-interval-control queues 22-1 to 22-n, and count values specified by the schedule management block 24.

The packet readout block 26 reads the output-interval-control packet Pa from any of the output-interval-control queues 22-1 to 22-n in accordance with the readout instruction given from the schedule management block 24 after the counting ends, and outputs the packet. The packet readout block 26 also reads the non-output-interval-control packet Pb from the non-output-interval-control queue 23 in accordance with the readout instruction for the non-output-interval-control packet Pb, and outputs the packet. The output packet is given a new packet header when it is output.

The readout processing in the packet readout block 26 with respect to the output-interval-control queues 22-1 to 22-n will next be described. The packet readout block 26 performs round-robin packet readout processing with respect to the output-interval-control queues 22-1 to 22-n.

Suppose that packets are read from queues Q1 to Q4. In the round-robin readout processing, the packets are read from a plurality of queues in rotation. Each queue from which a packet is read is added at the end of the readout sequence. If the queues are read in the order of Q1, Q2, Q3, and Q4, for instance, Q1 is next read after Q4. That is, the packets stored in the queues Q1 to Q4 are read in the order of Q1, Q2, Q3, Q4, Q1, Q2, and so on.

If the read-target queue does not store a packet, for instance, if the queue Q1 does not have any packet at the timing when the queue Q1 is read, the queue Q2 is read first. If a packet is stored then in the queue Q1, since the read queue (queue Q2 in this example) is brought to the end of the readout sequence, the readout sequence becomes Q2, Q1, Q3, Q4, Q2, and so on.

A queue table 24a managed by the schedule management block 24 will next be overviewed. FIG. 5 shows the queue table 24a. The schedule management block 24 has the queue table 24a, and the queue table 24a is updated with the arrival time information of a packet for each input port.

The queue table 24a is provided for each of the output-interval-control queues 22-1 to 22-n, and has the following items: label, arrival time (Tar), relative input time (Tr), valid readout time (Tav), packet output time (To), and counter setting time (Tc).

The label corresponds to a management number of contents of the queue table 24a. The arrival time (Tar) is a value of the arrival time information given in the input network interface block 10.

The relative input time (Tr) is a time difference between the arrival time of the packet and the arrival time of the packet arrived immediately therebefore (=(arrival time of the packet)−(arrival time of the packet arrived immediately therebefore). The Tr value becomes zero for the first packet after the activation of the apparatus and when the output-interval-control queue of the corresponding port does not have any packet.

The valid readout time (Tav) indicates the time at which the schedule management block 24 notifies the packet readout block 26 that a readout is possible after the counting of the counter setting time (Tc) is completed.

The packet output time (To) indicates the time at which the packet is output from the packet readout block 26. The counter setting time (Tc) is specified for the counter blocks 25-1 to 25-n and corresponds to a wait time until the output-interval-control packet Pa is output from the output-interval-control queue. A non-zero counter setting time (Tc) is obtained from this expression: Counter setting time (Tc)= (Relative input time (Tr))−(Packet output time (To) of the preceding packet)−(Valid readout time (Tav) of the preceding packet).

Figure 6:
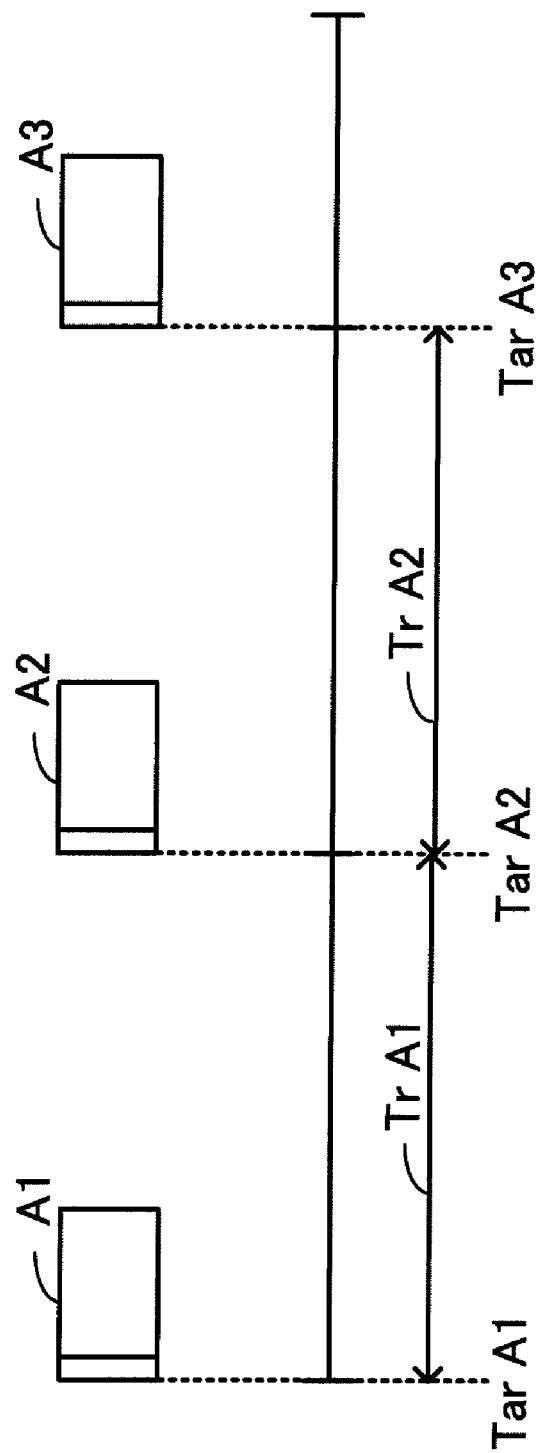
FIG. 6 shows a packet input state.

Readout control for the output-interval-control packets Pa, which is an operation of the schedule management block 24, will be described next in detail with reference to FIGS. 6 to 11. FIG. 6 is a view showing a packet input state. Suppose that packets A1 to A3 are input to the same port (port #1) of the packet relay apparatus 1.

Suppose also that the output-interval-control queue 22-1 corresponds to port #1, and the arrival times of the packets A1 to A3 are denoted by Tar A1 to Tar A3. The time interval between the packets A1 and A2 is denoted as Tr A1 (=Tar A2−Tar A1), and the time interval between the packets A2 and A3 is denoted as Tr A2 (=Tar A3−Tar A2).

FIG. 7 is a view showing a state of the queue table. A queue table 24a-1 shows such a table state that the first packet A1 is input to the output-interval-control queue 22-1 corresponding to port #1.

The arrival time (Tar) corresponding to label A1 is Tar A1. The relative input time (Tr), which is the time difference between the arrival time of the packet and the arrival time of the packet arrived immediately therebefore, of the first packet A1 is zero because there is no preceding packet.

When the first packet A1 is written in the output-interval-control queue 22-1, the packet is ready to be sent, and the counter setting time (Tc) is zero. The packet output time (To) is left blank because the packet A1 is written in the output-interval-control queue 22-1 and is not output. The valid readout time (Tav), which is specified by the schedule management block 24 as time in which the packet readout block 26 can read the packet A1 from the output-interval-control queue 22-1, is Tav A1 here.

FIG. 8 is a view showing a state of the queue table. A queue table 24a-2 shows such a table state that the second packet A2 is input to the output-interval-control queue 22-1 corresponding to port #1. The arrival time (Tar) corresponding to label A2 of the packet A2 is Tar A2, and the relative input time (Tr) is Tr A1 (=Tar A2−Tar A1).

FIG. 9 is a view showing a state of the queue table. A queue table 24a-3 shows such a table state that the packet A1 has been output from the apparatus. When the packet A1 is output from the apparatus at time To A1, this To A1 is written as the packet output time (To) corresponding to label A1.

The schedule management block 24 then specifies a counter value for outputting the packet A2 in the counter block 25-1. Because the input time interval between the packets A1 and A2 is Tr A1, a count value corresponding to Tr A1 is specified in the counter block 25-1 such that the packet A2 is output with the same time interval. Accordingly, the counter setting time (Tc) corresponding to label A2 is written as Tr A1.

FIG. 10 is a view showing a state of the queue table. A queue table 24a-4 shows such a table state that the third packet A3 is input to the output-interval-control queue 22-1 corresponding to port #1. The items corresponding to label A1 have already been deleted because the packet A1 was output from the apparatus.

The valid readout time (Tav) corresponding to label A2 of the packet A2 is specified as Tav A2. For label A3, the arrival time (Tar) of the packet A3 is Tar A3, and the relative input time (Tr) is Tr A2 (=Tar A3−Tar A2).

FIG. 11 is a view showing a state of the queue table. A queue table 24a-5 shows such a table state that the packet A2 has been output from the apparatus. When the packet A2 is output from the apparatus at time To A2, the packet output time (To) corresponding to label A2 is written as To A2.

The schedule management block 24 specifies a counter value for outputting the packet A3 in the counter block 25-1. The packet readout block 26 performs round-robin output control as described above, and the packet A3 may not be output immediately from the output-interval-control queue 22-1. If the packet A2 is output at time To A2, and if the delay time required for packet processing is a delay $\Delta Tc$ caused by the round-robin processing, $\Delta Tc$=To A2−Tav A2 (=(Output time (To) of the preceding packet)−(Valid readout time (Tav) of the preceding packet)).

Therefore, the counter setting value (correction time) for the output of the packet A3 is obtained by subtracting $\Delta Tc$ from the relative input time Tr A2 obtained between the packets A2 and A3, that is, Tr A2−$\Delta Tc$ (if Tr A2−$\Delta Tc \leq 0$, the schedule management block 24 notifies the packet readout block 26 immediately that the readout is allowed). After a lapse of Tr A2−$\Delta Tc$, the packet A3 is output at time To A3. When the packet A3 is output, the table information of label A2 is deleted.

Figure 12:
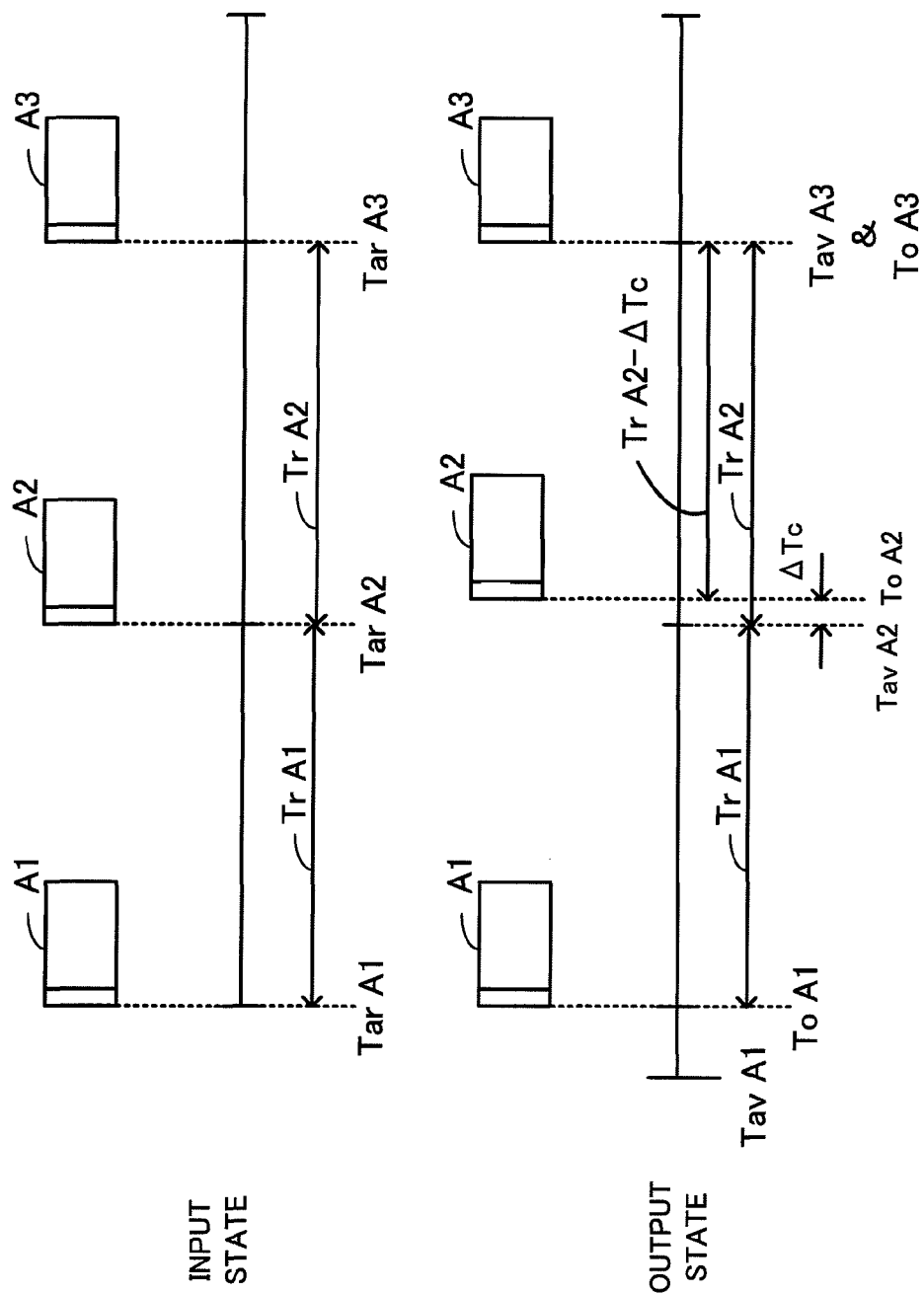
FIG. 12 shows a packet output state.

FIG. 12 is a view showing a packet output state. The figure shows the output states of the packets A1 to A3 described above with reference to FIGS. 7 to 11, in contrast with the input states of the packets A1 to A3 for the sake of clarity.

Figure 13:
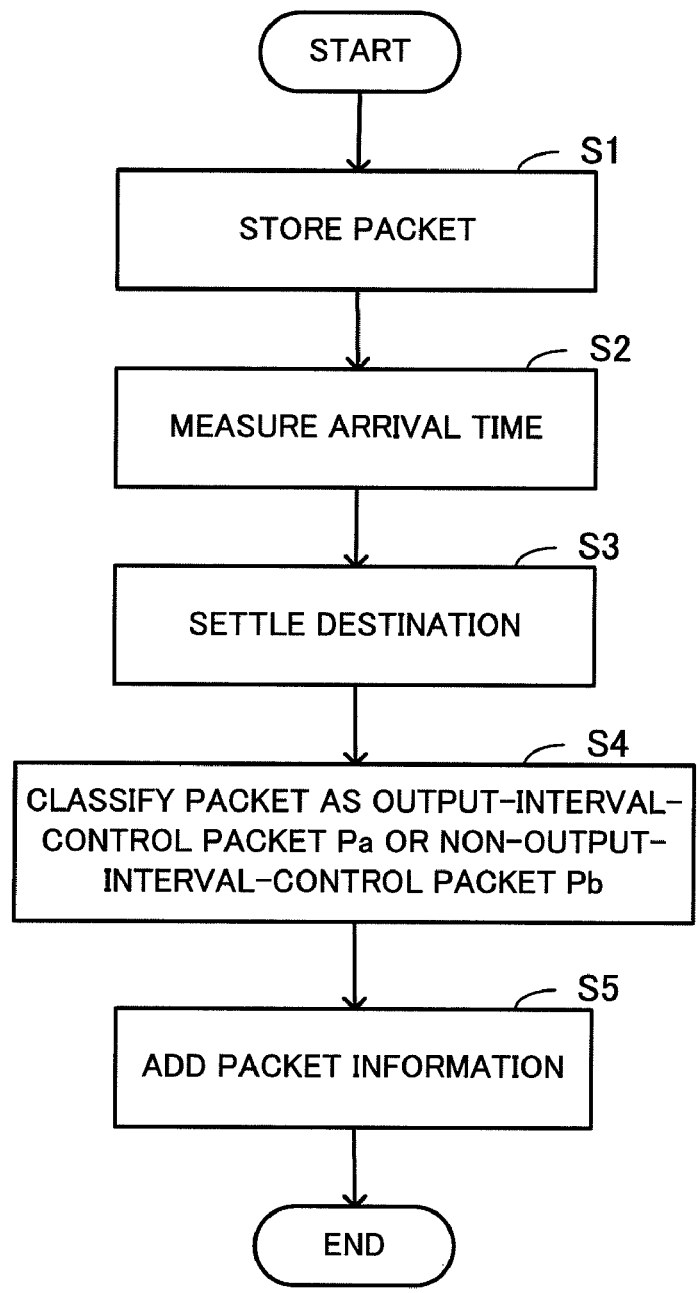
FIG. 13 is a flow chart showing the operation of the input network interface block.

The operation of the input network interface block 10 and the output network interface block 20 will next be described with reference to flow charts. FIG. 13 is a flow chart showing the operation of the input network interface block 10.

S1: The input buffer 11 stores a packet.

S2: The arrival time measurement block 12 measures the arrival time of the packet and generates arrival time information.

S3: The destination settlement block 13 settles the destination of the packet.

S4: The packet classification block 14 classifies the packet as the output-interval-control packet Pa or the non-output-interval-control packet Pb in accordance with the flow type of the packet and generates classification information.

S5: The packet information assignment block 15 adds the arrival time information and the classification information to the packet and sends the packet to the switch block 30.

Figure 14:
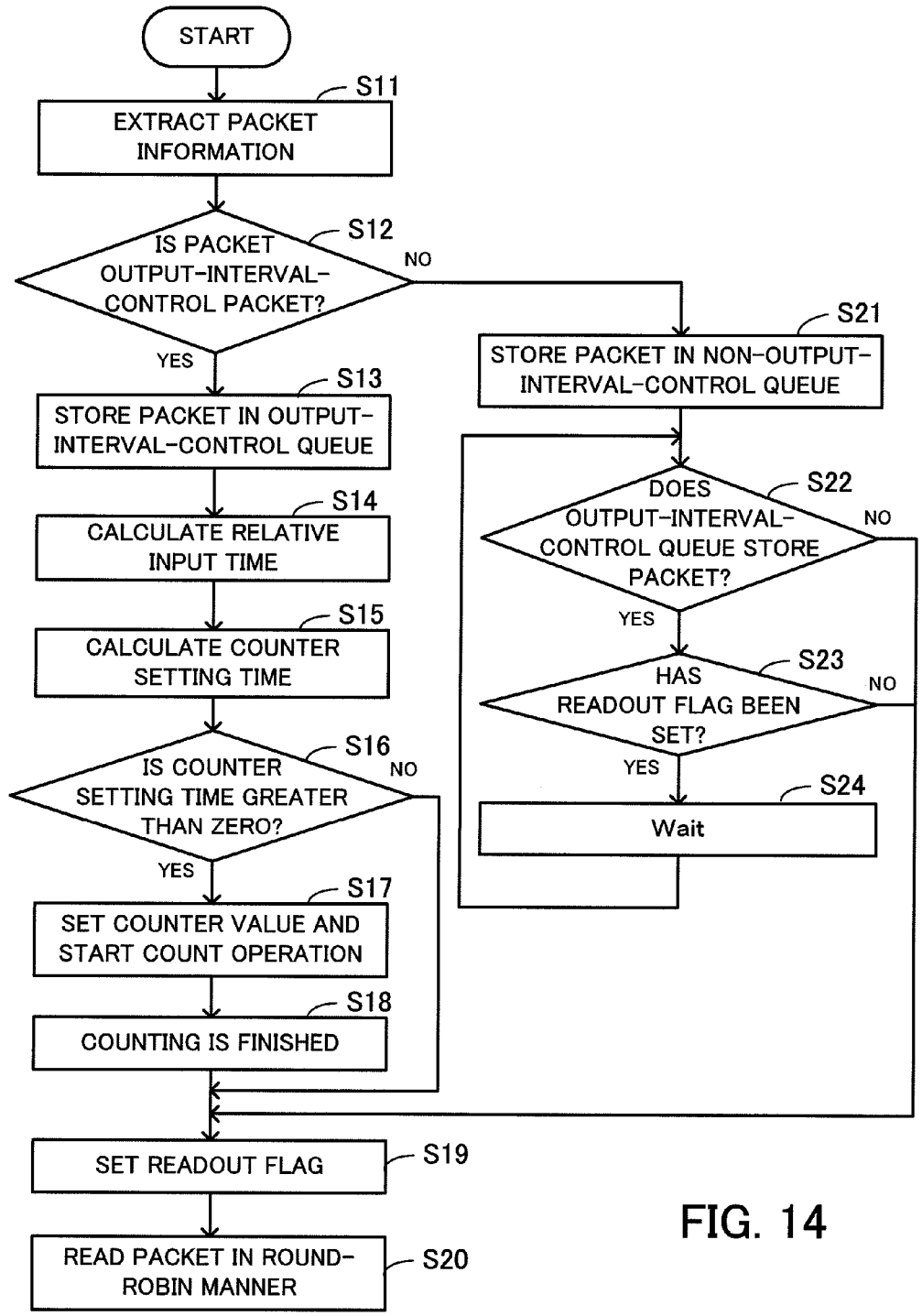
FIG. 14 is a flow chart showing the operation of the output network interface block.

FIG. 14 is a flow chart showing the operation of the output network interface block 20.

S11: The packet information extraction block 21a receives the switched packet, extracts the packet information, and sends the packet information to the schedule management block 24. The packet information extraction block 21a sends the received packet to the packet write block 21b.

S12: The packet write block 21b judges from the classification information whether the packet is an output-interval-control packet Pa or a non-output-interval-control packet Pb. If the packet is an output-interval-control packet Pa, the processing goes to step S13. If the packet is a non-output-interval-control packet Pb, the processing goes to step S21.

S13: An appropriate queue of the output-interval-control queues 22-1 to 22-n corresponding to ports stores the output-interval-control packet Pa.

S14: The schedule management block 24 calculates the relative input time (Tr).

S15: The schedule management block 24 calculates the counter setting time (Tc).

S16: The schedule management block 24 judges whether the counter setting time (Tc) is greater than zero. If yes, the processing goes to step S17. Otherwise, the processing goes to step S19.

S17: The schedule management block 24 specifies the counter setting time (Tc) as a counter value in the corresponding counter block, and the counter block starts a count operation.

S18: The counter block finishes counting.

S19: The schedule management block 24 sets a readout flag.

S20: The packet readout block 26 reads the packet in the round-robin manner and outputs the packet.

S21: The non-output-interval-control queue 23 stores the non-output-interval-control packet Pb.

S22: The schedule management block 24 checks whether the output-interval-control queues 22-1 to 22-n store a packet. If yes, the processing goes to step S23. Otherwise, the processing goes to step S19.

S23: The schedule management block 24 checks whether the readout flag of any output-interval-control queue is set. If yes, the processing goes to step S24. Otherwise, the processing goes to step S19.

S24: After a prescribed wait time, the processing returns to step S22.

When the readout flag is set in step S19, the flag setting time (Tav) is used in step S15. If the packet is output in step S20, the packet output time (To) is used in step S15.

A packet relay apparatus of the present invention is configured to measure the arrival time of an input packet, classify the packet as an output-interval-control packet, which requires output interval control, or a non-output-interval-control packet, which does not require output interval control, and performs such relay output control that the output intervals of output-interval control packets become equal to the input intervals obtained when the packets were input to the apparatus. This can suppress a burst transfer of relayed packets. Therefore, the need for a large buffer that can stand the burst transfer is eliminated, and the quality and reliability of packet communication are improved by preventing a packet from being lost.

In a packet relay method of the present invention, the arrival time of an input packet is measured; the packet is classified as an output-interval-control-packet, which requires output interval control, or a non-output-interval-control packet, which does not require output interval control; and relay output is controlled such that the output intervals of output-interval-control packets become equal to the input intervals obtained when the packets were input to the apparatus. This can suppress a burst transfer of relayed packets. Therefore, the need for a large buffer that can stand the burst transfer is eliminated, and the quality and reliability of packet communication are improved by preventing a packet from being lost.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet relay apparatus for performing packet relay control, comprising:
    an input network interface block comprising:
        an arrival time measurement block to measure an arrival time of each input packet to generate arrival time information,
        a packet classification block to classify the input packets into output-interval-control packets, which are subject to output interval control, and non-output-interval-control packets, which do not require the output interval control, to generate classification information, and
        a packet information assignment block to add packet information that includes the arrival time information and the classification information to the packets;
    an output network interface block comprising:
        an output-interval-control queue,
        a non-output-interval control queue,
        a packet distribution block to receive the packets which have been processed in the input network interface block and have been switched, and to place the output-interval-control packets in the output-interval-control queue and the non-output-interval-packet in the non-output-interval-control queue in accordance with the classification information,
        a schedule management block to perform the output interval control in accordance with the arrival time information such that an output interval of an output-interval-control packet and a next output-interval-control packet is equal to an input interval at which the output-interval-control packets were input to the apparatus, and
        a packet readout block to read the output-interval-control packets out of the output-interval-control queue and the non-output-interval-control packets out of the non-output-interval-control queue, in accordance with readout instructions from the schedule management block and to output the packets; and
    a switch block to switch the packets output from the input network interface block to the output network interface block;
    wherein the schedule management block calculates a time difference between the arrival time of the packet and an arrival time of a packet arrived immediately therebefore, calculates a correction time by correcting the time difference with a delay time required for packet processing in the apparatus,
    gives a readout instruction for the output-interval-control packet after counting of the time difference when the correction time is a zero time, and
    gives a readout instruction for the output-interval-control packet after counting of the correction time when the correction time is a non-zero time,
    wherein the delay time is a time difference between a valid readout time and a packet output time, the valid readout time indicating a time at which the readout instruction of a sending packet output a previous time is given to the packet readout block, and the packet output time indicating a time at which the sending packet is output from the packet readout block.

2. The packet relay apparatus according to claim 1, wherein the schedule management block gives the readout instructions for the non-output-interval packets after all output-interval-control packets are read from the queue.

3. A packet relay method for performing packet relay control, comprising:

measuring an arrival time of each input packet to generate arrival time information;

classifying the input packets into output-interval-control packets, which are subject to output interval control, and non-output-interval-control packets, which do not require the output interval control, to generate classification information;

adding packet information that includes the arrival time information and the classification information to the packets;

switching the packets having the packet information;

receiving the switched packets and placing the output-interval-control packets in an output-interval-control queue and the non-output-interval-control packets in a non-output-interval-control queue in accordance with the classification information;

performing the output interval control in accordance with the arrival time information such that an output interval of an output-interval-control packet and a next output-interval-control packet is equal to an input interval at which the output-interval-control packets were input to the apparatus, by calculating a time difference between the arrival times of two successive packets, calculating a correction time by correcting the time difference with a delay time required for packet processing in the apparatus;

reading the output-interval-control packets out of the output-interval-control queue after counting of the time difference when the correction time is a zero time and outputting the packets;

reading the output-interval-control packets out of the output-interval-control queue after counting of the correction time when the correction time is a non-zero time and outputting the packets; and generating readout instructions for the non-output-interval-control packets after all the output-interval-control packets are read from the output-interval-control queue, and outputting the non-output-interval-control packets, wherein the delay time is a time difference between a valid readout time and a packet output time, the valid readout time indicating a time at which the readout instruction of a sending packet output a previous time is generated, and the packet output time indicating a time at which the sending packet is output.

* * * * *